United States Patent [19]

Kaibara et al.

[11] 4,346,688
[45] Aug. 31, 1982

[54] INJECTION TIMING CONTROL SYSTEM FOR FUEL INJECTION PUMP

[75] Inventors: Nobuhiro Kaibara; Kazuyoshi Takaichi, both of Higashi-Matsuyama, Japan

[73] Assignee: Diesel Kiki Co., Ltd., Tokyo, Japan

[21] Appl. No.: 96,062

[22] Filed: Nov. 20, 1979

[30] Foreign Application Priority Data

Feb. 19, 1979 [JP] Japan ................................. 54-18137

[51] Int. Cl.³ .......................................... F02M 39/00
[52] U.S. Cl. .................................. 123/502; 123/357; 123/179 L
[58] Field of Search .............. 123/502, 357, 361, 483, 123/492, 482, 179 L, 501

[56] References Cited

U.S. PATENT DOCUMENTS

| 3,665,907 | 5/1972 | Laufer | 123/502 |
| 3,713,427 | 1/1973 | Adler | 123/357 |
| 3,757,750 | 9/1973 | Ohtani | 123/357 |
| 3,796,197 | 3/1974 | Locher | 123/357 |
| 4,180,037 | 12/1979 | Hobo | 123/357 |

Primary Examiner—Chares J. Myhre
Assistant Examiner—Carl Stuart Miller
Attorney, Agent, or Firm—Frishauf, Holtz, Goodman & Woodward

[57] ABSTRACT

In a fuel injection pump for use in an internal combustion engine, an injection timing control system actuatable in response to a pressure varying in dependence on engine r.p.m., which is designed to convert acceleration of a fuel injection quantity setting movable operating member into an electrical signal to obtain a control signal based upon said electrical signal for driving a magnet valve for controlling said pressure, thereby varying the injection timing by a proper amount in immediate response to an engine accelerating operation.

11 Claims, 6 Drawing Figures

INJECTION TIMING CONTROL SYSTEM FOR FUEL INJECTION PUMP

BACKGROUND OF THE INVENTION

This invention relates to a fuel injection system for internal combustion engines, and more particularly to a system for controlling the fuel injection timing of a fuel injection pump.

Fuel injection pumps in general for internal combustion engines such as diesel engine are provided with means for controlling the fuel injection timing so as to obtain a good combustion condition in the engine cylinders. The fuel injection timing control device was originally intended to operate mainly in dependence on the r.p.m. of the engine. However, the injection timing also influences the engine load or the fuel injection quantity, the engine temperature, the exhaust gas concentration, etc. Therefore, it is desirable to control the injection timing in relation to these factors as well.

Particularly, acceleration of an engine deeply concerns the noise, exhaust gas concentration and output characteristics of the engine. For instance, in accelerating the engine, noise or knocking occurs due to an advancement in the injection timing corresponding to the acceleration, and the Nox concentration in the engine exhaust gas increases due to an increased temperature in the engine cylinders. On the other hand, there is a problem that the engine output drops due to a time lag between the accelerating action and the actual advancement in the injection timing.

OBJECTS AND SUMMARY OF THE INVENTION

The primary object of the invention is to provide a fuel injection timing control system for fuel injection pumps, which, in accelerating the engine, is capable of adjusting the injection timing by a proper amount in immediate response to the accelerating action.

According to the invention, there is provided an injection timing control system in combination with a fuel injection pump for an internal combustion engine, the pump being of the type including a housing having a fuel chamber defined therein, fuel supply means for supplying fuel to said fuel chamber under pressure dependent on engine r.p.m., and fuel injection quantity control means having an operating member operatively connected thereto and displaceable to cause a change in the fuel injection quantity, said injection timing control system being actuatable in response to pressure within said fuel chamber and comprising:
 a. a magnet valve arranged to perform a periodic valve opening and closing action for control of the pressure within said fuel chamber;
 b. detecting means for electrically detecting acceleration of said operating member and to generate an acceleration rate signal representing the rate of said acceleration; and
 c. control means for processing said acceleration rate signal to supply a control pulse signal based thereon, to said magnet valve to drive same.

DETAILED DESCRIPTION

Figure 1:
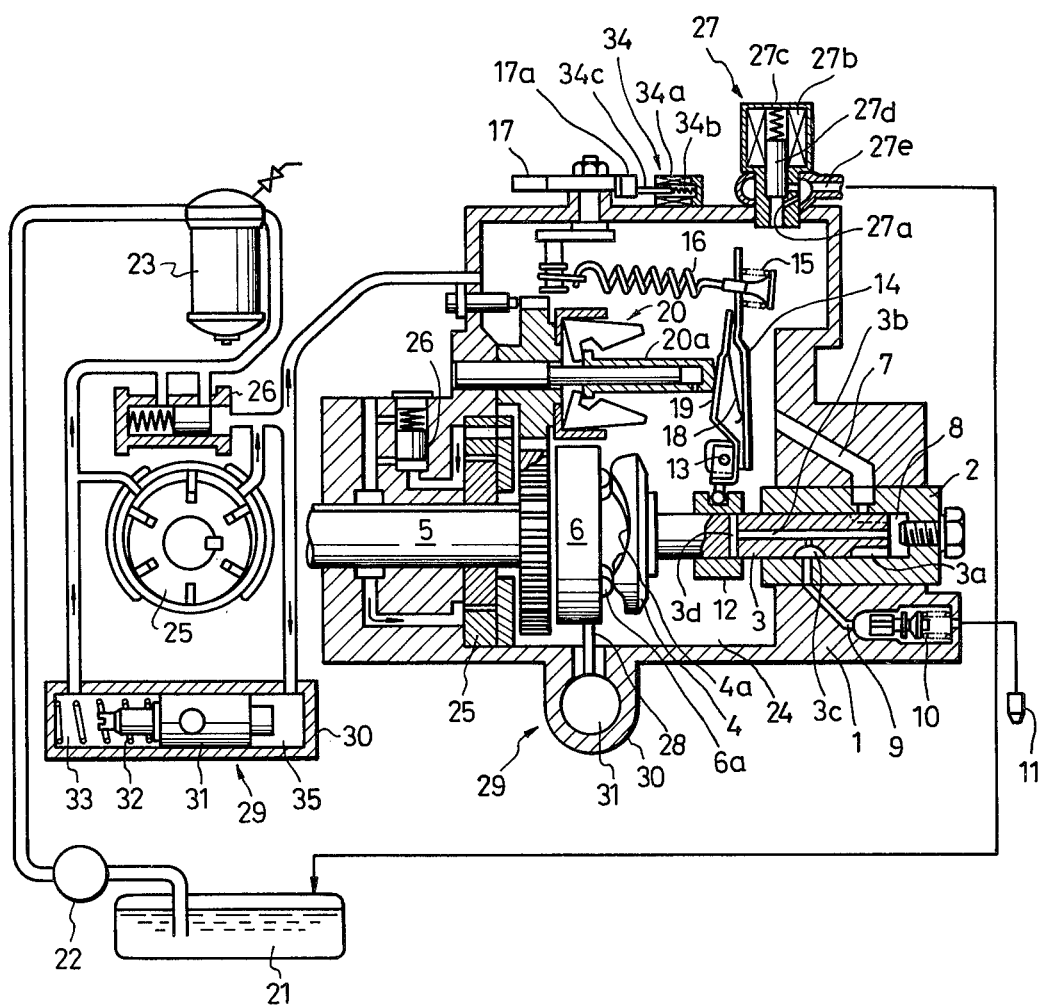
FIG. 1 is a semi diagrammatical vertical sectical view of a fuel injection pump provided with an injection timing control system according to the invention.

A distributor-type fuel injection pump according to the invention is illustrated in FIG. 1. A pump plunger 3 is slidably fitted in a plunger barrel 2 mounted within a pump housing 1 constituting the pump body. A cam disc 4 is mounted on an end of said plunger 3, which is coupled with a pump drive shaft 5 for rotation therewith. A roller holder 6 carrying a plurality of rollers 6a is provided concentrically with the drive shaft 5 in a fashion that the cam plate 4 has its cam surface 4a urged against said rollers 6a by means of a coil spring (not shown) or like means. Thus, the cam disc 4 and accordingly the plunger 3 are adapted to make rotational and reciprocating motions simultaneously, in unison with the rotation of the drive shaft 5. The motions of the plunger 3 cause the fuel delivered there through a fuel feeding line 7 to travel through end notches 3a, a pump working chamber 8, a central axial bore 3b and a side opening 3c, all formed in or by the plunger 3, and a passage 9 and delivery valves 10 (only one of them is shown) in said order, to be fed to injection valves 11 (only one of them is shown) provided in engine cylinders (not shown). A fuel quantity setting sleeve 12 is slidably fitted on the plunger 3, which cooperates with a radial port 3d formed in the plunger 3 in communication with the central axial bore 3b to determine the axial stroke of the plunger 3 and accordingly the fuel injection quantity. Said sleeve 12 is in engagement with a control lever 17 arranged on the housing 1 by way of a fixed common fulcrum 13, a tension lever 14, an idling spring 15 and a control spring 16. The fixed fulcrum 13 is also engaged by a starting spring 18 and a starting lever 19 which are urged by the movable sleeve 20a of a centrifugal governor 20 to bias the sleeve 12 in a fuel quantity increasing direction.

A fuel tank 21 is provided separately from the pump body 1. The fuel in the tank 21 is pumped by a fuel pump 22 to a filter 23 and the filtered fuel is delivered to a suction chamber 24 formed within the housing 1. On the way to the suction chamber 24 the fuel is pressurized by a feed pump 25 which is driven by the pump drive shaft 5 at speeds in dependence on or porportional to the engine r.p.m. and the pressurized fuel has its pressure adjusted to a value dependent on or proportional to the engine r.p.m. by a regulating valve 26, before being delivered to the suction chamber 24. Part of the fuel in the suction chamber 24 is spilled through an orifice 27a in a magnet valve 27 mounted on the housing 1 and is returned to the fuel tank 21. Said magnet valve 27 comprises the above-mentioned orifice 27a permanently communicating with the suction chamber 24, a magnet coil 27b, a coil spring 27c, a piston 27d and an outlet port 27e, and is arranged to repeat a periodic opening and closing action in response to a control pulse signal as described hereinbelow.

Provided at the lower part of the housing 1 is an injection timing control device 29 on which the fuel pressure in the suction chamber 24 adjusted as above acts. To be concrete, the roller holder 6 which is pivotally arranged in concentricity with the drive shaft 5 is engaged by an acting point on an end of a connecting lever 28 which has another acting point on its other end in engagement with a timer piston 31 fitted within a cylinder 30 projecting from the lower surface of the housing 1. Defined by the inner walls of the cylinder 30 and the opposite end faces of the piston 31 are a chamber 33 in which a coil spring 32 is placed and a pressurized fuel chamber 35 in which fuel delivered from the suction chamber 24 acts upon the piston 31. The position of the piston 31 and accordingly the circumferential position of the roller holder 6 by way of the lever 28 are determined by the difference between the force of the spring 32 and the pressure in the chamber 35. A change in the circumferential position of the roller holder 6 causes a change in the position of contact between the rollers 6a and the cam surface 4a of the cam disc 4, which in turn causes a change in the relationship between the circumferential phase of the drive shaft 5 and said position of contact, i.e., the acting position of the plunger 3, so that there occurs a change in the injection timing with respect to the angle of rotation of the drive shaft 5.

In the vicinity of the control lever 17 arranged on the outer surface of the housing 1 is provided a coil 34a of a detector 34 for detecting acceleration of said lever 17, which has its inductance variable with pivoting of the lever 17. That is, a core 34c has an end thereof urged by a spring 34b mounted in the detecting coil 34a and the other end disposed in urging contact with a cam plate 17a mounted on the pivot portion of the control lever 17.

Figure 2:
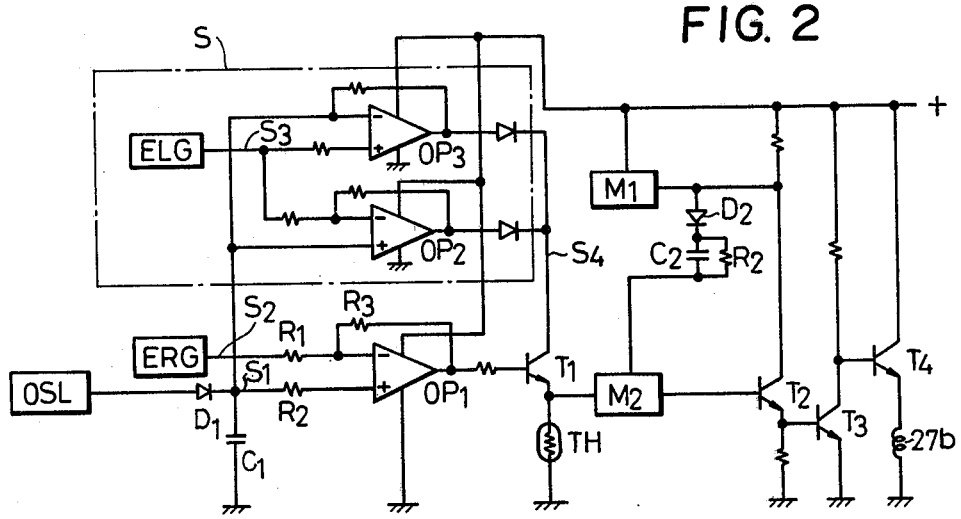
FIG. 2 is a diagram of a control circuit for use with the system of FIG. 1.

The output from the detecting coil 34a is applied to an electrical control circuit in FIG. 2. In this circuit, symbol OSL designates an LC oscillator including the abovementioned detecting coil 34a. Connected with this oscillator is a DA (digital to analog) converter consisting of a diode D1 and a capacitor C1, the analog output S1 of which is applied to the non-inverting input terminal of an operational amplifier OP1 having input resistances R1, R2 and a negative feedback resistance R3 to act as a differential amplifier. The inverting input terminal of said operational amplifier OP1 is supplied with an analog signal S2 having a voltage proportional to the engine r.p.m. from an engine r.p.m. signal generator ERG. The output terminal of the operational amplifier OP1 is connected with the base of an NPN transistor T1 of which the collector is connected with an injection timing vs engine load setting circuit S, and the emitter with a thermistor TH acting as an engine temperature sensor, respectively. The circuit S includes operational amplifiers OP2, OP3. The output of the DA converter is also connected with the non-inverting input terminal of the amplifier OP2 and the inverting input terminal of the amplifier OP3, and an engine load signal generator ELG is connected with the inverting input terminal of the amplifier OP2 and the non-inverting terminal of the amplifier OP3 to supply thereto an analog signal S3 representing the engine load. Under this arrangement, the sum output S4 of the two amplifiers OP2, OP3 is a function of the engine load based on the differential between the signal S1 and the load signal S3. The circuit S is optional in the invention and can be removed if necessary. Instead, a suitable constant-voltage regulated power supply can be connected with the collector of the transistor T1.

The emitter of the transistor T1 is further connected with a monstable multivibrator M2 which produces pulses having a constant period and a pulse width varying with a power supply voltage applied thereto. Connected to said multivibrator M2 is an astable multivibrator M1 by way of a detector and differentiation circuit comprising a diode D2, a capacitor C2 and a resistance R2. The output terminal of the monostable multivibrator M2 is connected with a Darlington circuit consisting of NPN transistors T2, T3. The collector of the transistor T3 is connected with an NPN transistor T4 which cooperates with the transistor T3 to form a NOT circuit. The output terminal of the astable multivibrator M1 is also connected with the collector of the transistor T2. Connected to the junction between the emitter of the transistor T4 and ground potential is the coil 27b of the magnet valve 27.

The operation of the above-described arrangement is as follows: Let it be assumed that the control lever 17 connected to an accelerator pedal (not shown) is now set to a certain position. The position of the core 34c relative to the coil 34a is determined by the cam 17a thus to determine the oscillation frequency of the LC oscillator OSL. The oscillation frequency is subjected to DA conversion by the diode D1 and capacitor C1 into a direct current signal S1 having a voltage level corresponding to said oscillation frequency, which signal S1 is applied to the non-inverting input terminal of the operational amplifier OP1. The inverting input terminal of the amplifier OP1 is supplied with a signal S2 from ERG having a direct current voltage level corresponding to the engine r.p.m. then available from the engine. Thus, the output from the amplifier OP1 can vary in agreement with the difference between the two input signals S1 and S2.

The conductance of the transistor T1 is determined by the output of the amplifier OP1 and signals representing the engine load and the engine temperature supplied from the circuit S and the thermistor TH. The output from the transistor T1 is applied to the power supply voltage input terminal of the monostable multivibrator M2. The monostable multivibrator M2 has its trigger pulse input terminal supplied with trigger pulses from the astable multivibrator M1 which is arranged to produce output pulses having a constant period and a constant pulse width, after it is subjected to detection and differentiation by the diode D2, capacitor C2 and resistance R2. The output from the monostable multivibrator M2 and the original output from the astable multivibrator M1 are fed to the transistor T2 constituting an AND circuit.

Figure 3:
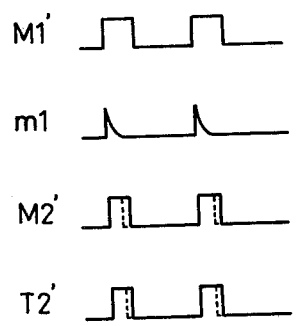
FIG. 3 is a chart of wave forms available from various elements in the control circuit of FIG. 2.

Thus, the transistor T2 produces an output pulse as long as the output pulses from the two multivibrators M1, M2 timewise coincide with each other. FIG. 3 shows waveforms of output pulses M1' from the astable multivibrator M1, their differentiated pulses m1, output pulses M2' from the monostable multivibrator M2 and output pulses T2' from the transistor T. The output pulses T2' are inverted in phase by the transistors T3 and T4 and then are fed to the magnet valve 27 via the output transistor T4. Thus, the magnet valve 27 is energized by output pulses from the transistor T4 which have a constant period and a given pulse width corresponding to the position of the control lever 17 then assumed, to perform a valving action so that the fuel pressure within the suction chamber 24 is kept at a prescribed value to maintain the piston 31 of the injection timing control device 29 at a prescribed position, thereby determining the injection timing.

When the accelerator pedal is stepped on to accelerate the engine, the core 34c is moved away from the coil 34a so that the oscillation frequency of the oscillator OSL becomes higher. An increase of the engine r.p.m. cannot immediately follow the stepping-on of the accelerator pedal, and accordingly the engine r.p.m. signal S2 is not yet increased in voltage. Therefore, the conductance of the transistor T1 increases to increase the voltage applied to the monostable multivibrator M2 which in turn supplies output pulses M1' with a correspondingly reduced pulse width. Thus, the resulting pulses T2' from the AND circuit T2 obtained by coincidence of the pulses M2' with pulses M1' from the astable multivibrator M1 have a reduced pulse width as indicated in dotted line in FIG. 3, so that the transistors T2 and T3 have a shorter time of conduction with a resulting longer opening time of the magnet valve 27. Accordingly, the pressure within the suction chamber 24 is decreased so that the piston 31 of the injection timing control device 29 is displaced by the spring 32 to cause a pivotal movement of the roller holder 6, resulting in a retardment in the injection timing. Thus, improvements can be obtained in the engine knocking as well as the concentration of Nox in the exhaust gas which would otherwise show particularly inferior results on acceleration of a diesel engine.

As the engine r.p.m. then increases following the stepping-on of the accelerator pedal, the output from the operational amplifier OP1 decreases to advance the injection timing. It will be understood that even if there occurs a change in the engine r.p.m. due to a change in the load applied to the engine or a like cause while the accelerator pedal position remains unchanged, the operation will be similar to that mentioned above, since the operational amplifier OP1 operates on the difference between the position acceleration signal and the engine r.p.m. signal.

Figure 4:
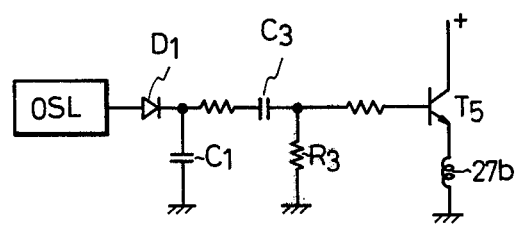
FIG. 4 is a diagram of another embodiment of the control circuit according to the invention.

FIG. 4 illustrates another embodiment of the circuit for obtaining a control signal based upon the engine accelerating operation, which is designed to obtain the control signal in a simpler manner than the arrangement of FIG. 2. According to this embodiment, a differentiation circuit comprising a capacitor C3 and a resistance R3 is connected between the DA converter D1, C1 similar to that used in FIG. 2 and the base of a transistor T5, the collector of which is connected with the coil 27b of the magnet valve 27 so that an acceleration or position signal OSL is differentiated through said circuit to obtain a control pulse signal. This circuit does not require an engine r.p.m. signal since the control pulse signal obtained has a differential waveform. The constants of the elements C3, R3 are set to suitable values so as to obtain a suitable opening time of the magnet valve 27, by taking into account the expected rise time of the engine r.p.m.

Figure 5:
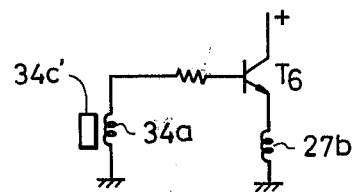
FIG. 5 is a diagram of still another embodiment of the control circuit according to the invention.

The circuit of FIG. 5 is further simplified as compared with the arrangement of FIG. 4. In this circuit, a generator means is used instead of the LC oscillator OSL. The core 34c' of the acceleration detector 34 is formed of a permanent magnet and cooperates with the coil 34a to constitute said generator means. The core 34c has one end connected with the base of a transistor T6 and the other end with the ground. The coil 27b of the magnet valve 27 is connected in series with the collector of the transistor T6. An output voltage from the coil 34a proportional to the rate of acceleration of the core 34c' drives the coil 27b via the transistor T6.

Figure 6:
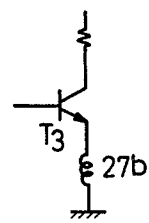
FIG. 6 is a diagram of a further embodiment of the control circuit according to the invention.

If it is desired to increase the engine output in accelerating the engine as opposed to the above-described embodiments, in the embodiment of FIG. 2, the magnet valve 27 may be connected between the emitter of the transistor T3 and the ground, while removing the transistor T4, as shown in FIG. 6. According to the FIG. 6 arrangement, when the engine is accelerated, the coil 27b of the magnet valve 27 is energized by a pulse signal produced at the emitter of the transistor T3 with a reduced pulse width to cause an advance in the injection timing. As a consequence, the time lag can be eliminated between the accelerating action and the actual advance in the injection timing, to insure sufficient engine output.

As described above, according to the invention, the rate of acceleration of the engine which constitutes one of the factors for control of the injection timing of a fuel injection pump is obtained in a direct manner by means of an acceleration-based control signal to actuate the magnet valve. Thus, accurate injection timing control can be carried out in quick response to the action of accelerating the engine, which is very effective for the improvement of noise, output and exhaust gas concentration characteristics of the engine.

What is claimed is:

1. An injection timing control system in combination with a fuel injection pump for an internal combustion engine, the pump being of the type including a housing having a fuel chamber defined therein, fuel supply means for supplying fuel to said fuel chamber under pressure dependent upon engine r.p.m., and fuel injection quantity control means having an operating member operatively connected thereto and displaceable to cause a change in the fuel injection quantity of the pump, said injection timing control system being actuatable in response to pressure within said fuel chamber and comprising:
  a. a magnet valve arranged to perform a periodic valve opening and closing action for control of the pressure within said fuel chamber;
  b. detecting means for electrically detecting an acceleration of said operating member and to generate an acceleration rate signal representing the rate of said acceleration of said operating member; and
  c. control means for processing said acceleration rate signal to supply a control pulse signal which is a function of said acceleration rate signal to said magnet valve to drive same.

2. The system as recited in claim 1, wherein said control pulse signal supplied from said control means has a pulse width proportional to the rate of said acceleration of said operating member, whereby the pressure within said fuel chamber is reduced responsive to said control pulse signal to retard the fuel injection timing of the pump.

3. The system as recited in claim 1, wherein said control pulse signal supplied from said control means has a pulse width inversely proportional to the rate of said acceleration rate signal, whereby the pressure within said fuel chamber is increased responsive to said control pulse signal to advance the fuel injection timing of the pump.

4. The system as recited in claim 1, further comprising means for supplying a signal representing the engine r.p.m. to said control means, said control means including means for supplying said control pulse signal having a pulse width corresponding to the difference between said acceleration rate signal and said engine r.p.m. signal.

5. The system as recited in claim 1, further comprising means coupled to said detecting means for compensating for the value of said acceleration rate signal in response to a signal representing a load applied to the engine.

6. The system as recited in claim 1, further comprising means coupled to said detecting means for compensating for the value of said acceleration rate signal in response to a signal representing a temperature in the engine.

7. An injection timing control system in combination with a fuel injection pump for an internal combustion engine, the pump being of the type including a housing having a fuel chamber defined therein, fuel supply means for supplying fuel to said fuel chamber under pressure dependent upon engine r.p.m., and fuel injection quantity control means having an operating member operatively connected thereto and displaceable to cause a change in the fuel injection quantity of the pump, said injection timing control system being actuatable in response to pressure within said fuel chamber and comprising:
   a. a magnet valve arranged to perform a periodic valve opening and closing action for control of the pressure within said fuel chamber;
   b. means comprising a magnet coil and a core displaceable in unison with said operating member with respect to said magnet coil, for electrically detecting an acceleration of said operating member, and to generate an acceleration rate signal having a frequency corresponding to the rate of acceleration of said operating member;
   c. means for converting said acceleration rate signal into an analog signal having a direct current voltage corresponding to the frequency of said acceleration rate signal;
   d. a monostable multivibrator arranged to be supplied with said analog signal through a supply voltage input terminal thereof;
   e. an astable multivibrator arranged to produce an output pulse signal having a constant period and a constant pulse width;
   f. means for detecting and differentiationg an output pulse signal from said astable multivibrator and supplying a trigger signal as a function of said output pulse signal to said monostable multivibrator;
   g. an AND circuit having input terminals connected with the output terminals of said astable and monostable multivibrators; and
   h. a switching circuit coupled to said AND circuit and arranged to be turned on or off in response to an output from said AND circuit to supply an output for driving said magnet valve.

8. The system as recited in claim 7, including a differential amplifier arranged between said analog converter means and said monostable multivibrator, said differential amplifier having an input terminal thereof connected with the output of said analog converter means, and an engine r.p.m. signal generator connected with the other input terminal of said differential amplifier.

9. The system as recited in claim 7, including means for compensating an output voltage of said control means in response to at least one of a load applied to the engine and a temperature in the engine.

10. An injection timing control system in combination with a fuel injection pump for an internal combustion engine, the pump being of the type including a housing having a fuel chamber defined therein, fuel supply means for supplying fuel to said fuel chamber under pressure dependent upon engine r.p.m., and fuel injection quantity control means having an operating member operatively connected thereto and displaceable to cause a change in the fuel injection quantity of the pump, said injection timing control system being actuatable in response to pressure within said fuel chamber and comprising:
   a. a magnetic valve arranged to perform periodic valve opening and closing action for control of the pressure within said fuel chamber;
   b. means comprising a magnet coil and a core displaceable in unison with said operating member with respect to said magnet coil, for electrically detecting an acceleration of said operating member, and to generate an acceleration rate signal having a frequency corresponding to the rate of acceleration of said operating member;
   c. means for converting said acceleration rate signal into an analog signal having a direct current voltage corresponding to the frequency of said acceleration rate signal;
   d. means for differentiating said analog signal; and
   e. switching means arranged to be turned on or off in response to a signal obtained by said differentiation to supply an output for driving said magnet valve.

11. An injection timing control system in combination with a fuel injection pump for an internal combustion engine, the pump being of the type including a housing having a fuel chamber defined therein, fuel supply means for supplying fuel to said fuel chamber under pressure dependent upon engine r.p.m., and fuel injection quantity control means having an operating member operatively connected thereto and displaceable to cause a change in the fuel injection quantity of the pump, said injection timing control system being actuatable in response to pressure within said fuel chamber and comprising:
   a. a magnet valve arranged to perform a periodic opening and closing action for control of the pressure within said fuel chamber;
   b. means comprising a magnet coil and a permanent magnet displaceable in unison with said operating member with respect to said magnet coil, for electrically detecting an acceleration of said operating member, and to generate an acceleration rate signal having a voltage corresponding to the rate of acceleration of said operating member; and
   c. switching means arranged to be turned on or off in response to said acceleration rate signal to supply an output for driving said magnet valve.

* * * * *